United States Patent [19]

Foresman

[11] Patent Number: 5,366,680
[45] Date of Patent: Nov. 22, 1994

[54] ANNULAR GAP EXTRUDER

[75] Inventor: James D. Foresman, Hughesville, Pa.

[73] Assignee: Andritz Sprout-Bauer, Inc., Muncy, Pa.

[21] Appl. No.: 59,236

[22] Filed: May 7, 1993

[51] Int. Cl.$^5$ .............................................. B29C 47/92
[52] U.S. Cl. ................................ 264/141; 264/118; 264/176.1; 264/211.10; 264/211.11; 264/211.21; 425/202; 425/208; 425/311; 425/313; 425/378.1; 425/382.3; 425/382.4; 425/381; 425/466; 426/516
[58] Field of Search ...................... 264/176.1, 141–143, 264/211.10, 209.2, 118, 211.11, 211.21; 425/202, 205–209, 203, 382.3, 311, 313, 382.4, 382 R, 381, 466, 467, 378.1; 426/516

[56] References Cited

U.S. PATENT DOCUMENTS

| 3,191,229 | 6/1965 | Vanzo | 425/381 |
|---|---|---|---|
| 3,488,416 | 1/1970 | Rothschild | 264/211.1 |
| 3,861,844 | 1/1975 | Miller | 425/381 |
| 3,862,594 | 1/1975 | Stölting et al. | 425/202 |
| 4,097,213 | 6/1978 | McComb et al. | 425/381 |
| 4,104,958 | 8/1978 | Manser et al. | 425/205 |
| 4,171,668 | 10/1979 | Ratcliffe | 426/516 |
| 4,255,161 | 3/1981 | Grimminger et al. | 425/203 |
| 4,381,184 | 4/1983 | Hurni et al. | 425/382 R |
| 4,632,795 | 12/1986 | Huber et al. | 425/382.3 |
| 4,881,886 | 11/1989 | Neuman | 425/382.4 |

FOREIGN PATENT DOCUMENTS

62-138170 6/1987 Japan ................................. 426/516

Primary Examiner—Jeffery Thurlow
Attorney, Agent, or Firm—Chilton, Alix & Van Kirk

[57] ABSTRACT

A method and apparatus in the context of a rotating conveying screw situated within a cylindrical housing which has an inlet port on one end of the cylinder and a discharge opening on the other end of the cylinder. A resistance plate is mounted transversely to the conveying screw near the discharge opening for corotation with the screw. The plate is mounted to define a discharge gap between the opening and the plate. A sleeve on the housing is employed to adjust the size of the gap between the plate and the opening. The resistance plate can be a flat disc, conical, or other shape, so long as it is effectively attached to and rotates with the screw. The helical screw is preferably supported at both ends by a bearing means. Breaker bars are mounted on the transverse plate and extend over the gap between the discharge opening and the plate. Breaker bars may also be mounted to the cylindrical sleeve and extend over the gap between the sleeve and the plate. In another aspect of the invention, a flow of steam or a hot fluid enters and/or leaves the interior of the screw, through the end of the screw near the discharge opening.

17 Claims, 6 Drawing Sheets

ANNULAR GAP EXTRUDER

BACKGROUND OF THE INVENTION

The present invention is directed to conditioning feed material prior to the feed entering a pellet mill, and more particularly, to an annular gap extruder to perform the conditioning.

Conditioning refers to adding high levels of mechanical shear and compression to a product, adding high levels of liquids such as fats and molasses to the product, and thoroughly mixing the product. Adding heat to the product is also an advantage because of the reduction of bacteria in the feed. This is important to such operations as poultry production where salmonella can be extremely destructive to the poultry.

In recent years special screw type extruders have been used to highly condition feeds. These units usually consist of a helical conveying screw of rugged construction that has interruptions of the helix evenly positioned along the screw length. Generally at each interruption of the helix along the screw there are positioned radial pins or bars that can be adjusted toward or away from the screw shaft to aid in conditioning. The feed discharges axially at the downstream end of the screw, which is generally not supported by any bearing, resulting in a cantilevered support arrangement for the screw. Resistance to the flow of the feed material through the extruder is produced by a ram that is generally cone shaped and that can be moved axially. The point of the ram is oriented toward the end of the helical screw, and the result is an annular discharge gap between the discharge end of the extruder and the ram. The gap can be adjusted by moving the ram in and out along the axis of the cone.

There are several disadvantages to such an arrangement. First the force of the ram against the flow of the feed translates to the helical screw, therefore increasing the forces on the screw and the bearing arrangement. Since the ram does not generally rotate, the effect of compression on the feed, combined with the high level of liquids in the feed, results in discharging the feed in cohesive lumps. It is usually necessary to install a lump breaker down stream from the extruder to break up any large lumps of conditioned feed. Since only one end of the screw is accessible, it is difficult to directly heat the screw. Other means of heating the feed have included encasing the housing in a heating jacket, increasing the complexity of the extruder.

SUMMARY OF THE INVENTION

It is an object of the present invention to provide the high shear compression and mixing forces available in conventional annular gap extruders, while reducing the forces on the helical conveying screw and on the thrust bearings supporting the screw.

It is another object to reduce the clumping of feed from the annular gap extruder and eliminate the need for a lump breaker further downstream.

It is a further object to simplify the heating of the feed thereby reducing the incidence of bacteria in the feed.

These objects are accomplished by a method and apparatus in the context of a conveying screw situated within a cylindrical housing which has an inlet port on one end of the cylinder and a discharge opening on the other end of the cylinder. A motor or other means turns the screw in the housing. In one aspect of the invention, a resistance plate is mounted transversely to the conveying screw near the discharge opening for corotation with the screw. The plate is mounted to define or establish the discharge gap between the opening and the plate. A means is employed to adjust the size of the gap between the plate and the opening.

The resistance plate can be a flat disc, conical, or other shape, so long as it is effectively attached to and rotates with the screw.

In the preferred embodiment the screw flight is an interrupted helix. At each interruption radial bars or pins extend toward the screw shaft and may be adjusted toward or away from the screw shaft. The helical screw is supported at both ends by a bearing means. The means for adjusting the gap between the plate and the discharge opening is a sleeve that fits around the end of the cylindrical housing at the discharge opening and can be moved parallel to the length of the cylinder. A hydraulic means, electric motor and screw jack arrangement, or other means is employed to move the sleeve. By movement of the sleeve the gap can be adjusted.

In another aspect of the preferred embodiment breaker bars are mounted on the transverse plate. The breaker bars extend over the gap between the discharge opening and the plate. Breaker bars may also be mounted to the cylindrical sleeve and extend over the gap between the sleeve and the plate.

In another aspect of the invention, a flow of steam or a hot fluid enters and/or leaves the interior of the screw, through the end of the screw near the discharge opening. Steam can be added and extracted from the same end of the screw.

In the method embodiment of the invention feed is introduced to the inlet end of the housing. The feed is compressed and sheared as it is forced through the housing by the turning helical screw. The movement of the feed through the cylinder housing is impeded by the plate mounted transversely to the helical shaft. The feed can be further compressed as it is forced through the gap between the discharge housing and the plate.

In the preferred embodiment the feed and contained liquids such as fat and molasses, is compressed and sheared as it is forced through the housing by the turning helical screw and passes by the bars or pins at the interrupted flights of the helical screw. The feed temperature is raised by contact with the internally heated conveying screw. As the feed passes through the gap between the discharge housing and the plate it experiences shear forces from the breaker bars mounted on the plate, on the discharge housing, or on both. Any large lumps of the feed are broken up into smaller pieces by the breaker bars.

The invention provides several significant advantages, most of which result from the elimination of a ram at the discharge end of the screw. The arrangement of the plate on the screw allows bearing means to be placed at both ends of the conveying screw. Because the screw is not cantilevered, smaller bearing means can be employed at the inlet end. Easy access is provided to the interior of the screw along the axis at the discharge end, enabling the screw to accommodate heating lines at the discharge end. This results in a simpler construction and the ability to heat the screw directly instead of heating the entire cylinder by means of a hot jacket. Such direct heating reduces the incidence of bacteria in the feed, and is particularly important for poultry operations where salmonella can be highly destructive. By mounting the plate on the helical conveying screw, the forces on the bearings means are reduced. Instead of the ram employed in prior methods, which added to the force on the bearings, the plate creates a force opposite to that which pushes the feed through the apparatus, reducing size requirement for the smaller thrust bearings. Breaker bars mounted on the plate, the cylindrical sleeve, or both the plate and the cylindrical sleeve break up lumps of feed and eliminate the necessity of a device to break up lumps farther down stream in the manufacturing process.

BRIEF DESCRIPTION OF THE DRAWINGS

These and other objects and advantages of the invention will be described below in connection with the preferred embodiment of the invention and with reference to the accompanying drawings, in which.

DESCRIPTION OF THE PREFERRED EMBODIMENT

Figure 1:
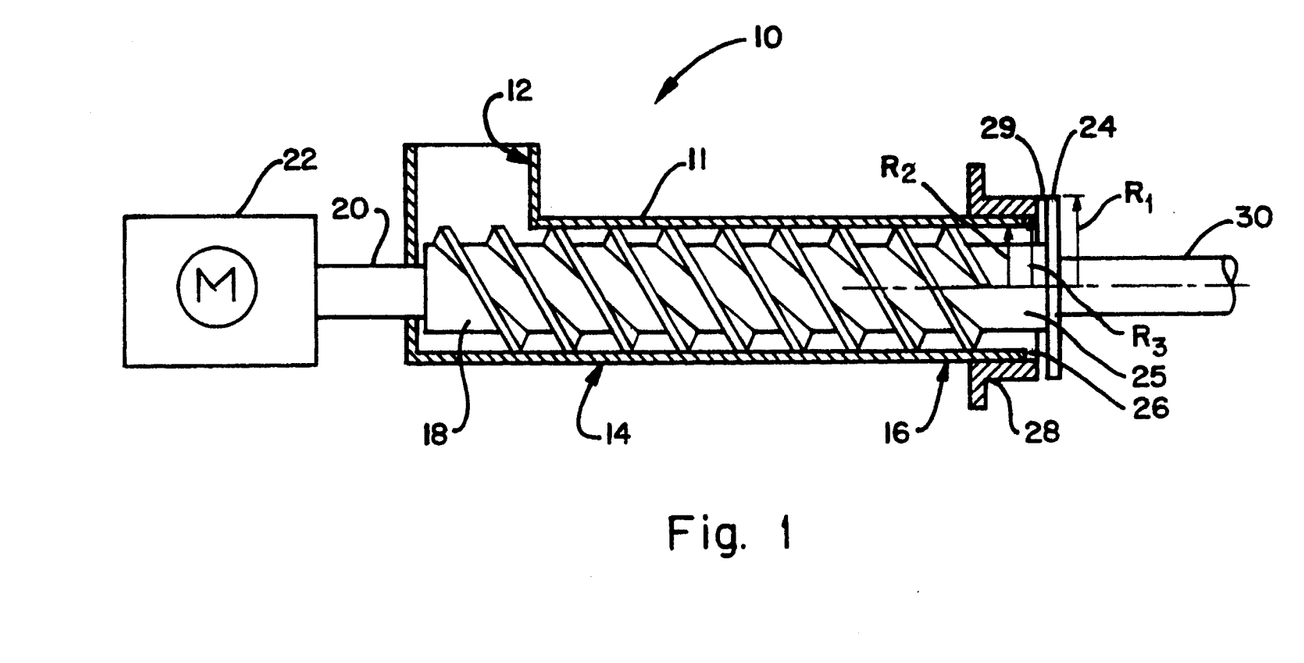
FIG. 1 is a side view, partly in section, of a schematic extruder in accordance with the invention.

FIG. 1 shows an annular gap extruder 10 which includes a cylindrical housing 11 with an inlet port 12 attached to or formed at a first, or inlet, end. The cylindrical housing 11 has a compressing section 14, and a discharge section 16 at a second, or discharge, end. Inside of the cylindrical housing 11 is a helical conveying screw 18, having an inlet end at the inlet port and a discharge end at the discharge section. A shaft projection 20 at the inlet end connects the helical conveying screw to a means for turning the shaft such a motor 22. A resistance plate 24 is mounted transversely to the discharge end of the helical conveying screw. A smooth portion 25 of the shaft exists between the end of the helix and the plate 24. The plate is mounted so a gap 26 is defined between the discharge end of the housing 16 and the plate 24. In the preferred embodiment the plate 24 is a substantially flat disc. The radius R1 of the plate 24 is greater than the radius R2 of the discharge section of the cylinder 16. The gap 26 is between the end of the discharge section of the housing 16 and the face of the plate 24. A cylindrical sliding sleeve 28 mounts around the discharge end 16 of the cylindrical housing 11. The radius R3 of the sliding sleeve 28 is less than the radius of the R1 of the plate 24. A discharge gap 29 is defined between the end of the sliding sleeve 28 and the face of the plate 24. A shaft projection 30 continues from the discharge end of the helical conveying screw 18 to a bearing means (not shown).

Feed enters inlet port 12 while the helical conveying screw 18 is rotating. The feed is compressed and conditioned as it passes through the compression section 14 of the extruder 10. When the feed reaches the smooth portion of the shaft 25, the feed is directed annularly (i.e., radially outward) by plate 24. The feed is then forced through the gap 26 between the discharge section of the housing 16 and the plate 24. In the simplest embodiment the feed would then leave the extruder. In the preferred embodiment the feed would continue to be forced through the gap 29 between the sliding sleeve 28 and the plate 24. The gap 29 can be adjusted by sliding the sleeve 28 along the length of the cylinder 11. By adjustment of the gap 29 and the rate of rotation of the helical conveying screw the quantity of the feed through the extruder 10 and the amount of conditioning can be adjusted.

Figure 2:
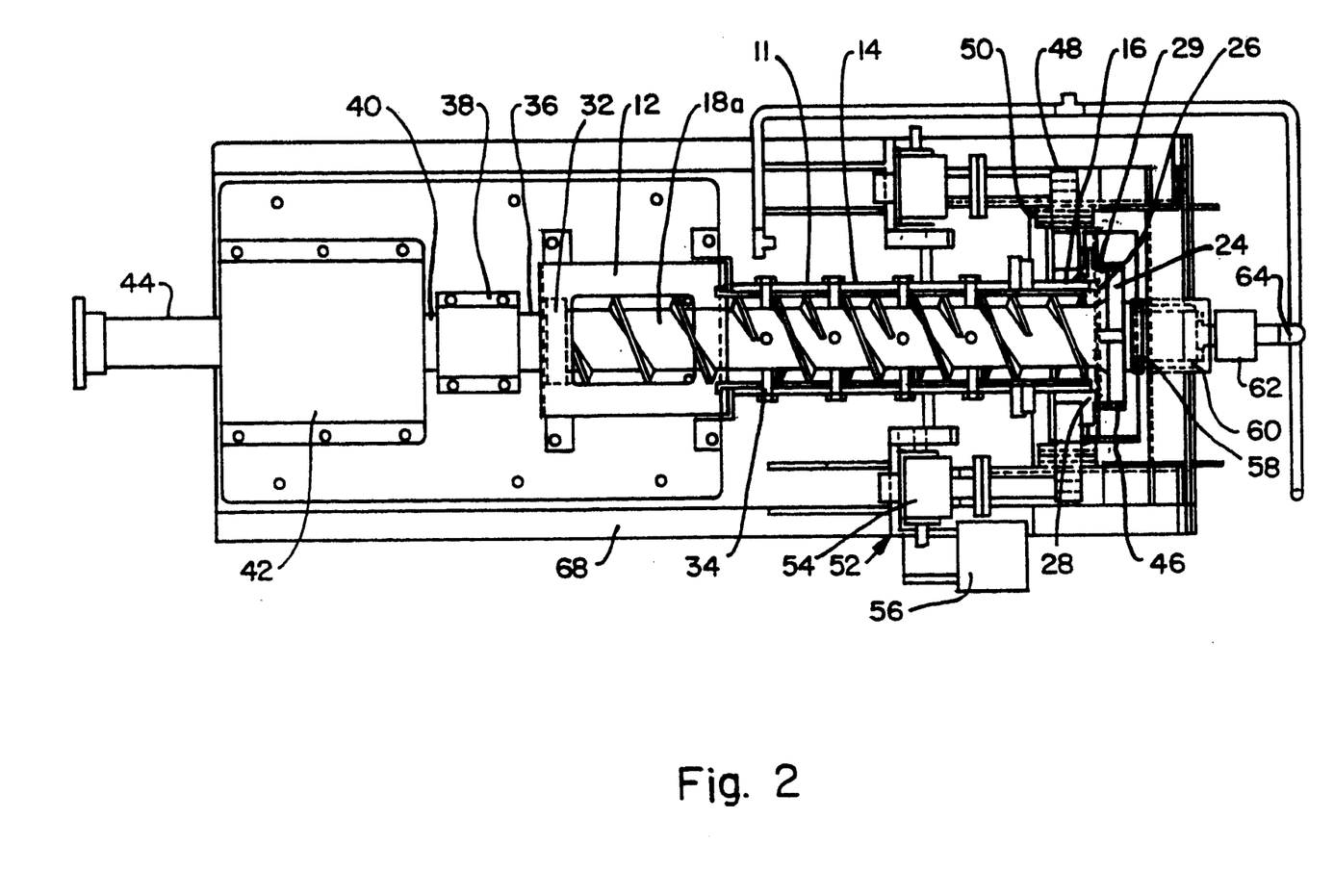
FIG. 2 is a top view, partly in section, of the preferred embodiment of the extruder.

FIG. 2 shows the preferred embodiment of the invention, having the basic elements of a cylindrical housing 11 with an inlet port 12, a compression section 14 and a discharge section 16. Inside the inlet port 12 is a sealing bushing 32 to keep the feed from escaping the inlet port 12. A helical conveying screw with interrupted flights 18a turns inside the cylindrical housing 11". Inside of the compression section 14 of the cylindrical housing 11", adjustable pins or bars 34 are at the interruptions of the flights of the helical conveying screw with interruptions 18a. The adjustable pins or bars 34 can be adjusted radially toward or away from the helical conveying screw.

A shaft 36 connects the helical conveying screw 18a to a coupling 38. The coupling 38 connects through a shaft 40 to a thrust bearing and reducer means 42. The thrust bearing and reducer means 42 accepts the force of the helical conveying shaft 18a as it forces the feed through the compression section 14. Shaft 44 connects the reducer thrust bearing 42 to a means for turning the shaft such as a motor.

A resistance plate 24 is mounted transversely to the discharge end of the helical conveying screw 18a. Mounted to the plate 24 are breaker bars 46 for breaking up lumps of conditioned feed that exit the extruder. A cylindrical sliding sleeve 28 mounts around the discharge end 16 of the cylindrical housing 11. A support mechanism 48 connects the cylindrical sliding sleeve 28 through a sliding key way mechanism 50 to a driving means 52 for moving the cylindrical sliding sleeve 28 to change the discharge gap 29. The driving means in the preferred embodiment would be by a screw jack 54 connected to an adjustable gear motor 56 or the driving means could be accomplished by hydraulic means.

A shaft 58 connects from the helical conveying screw 18a to a bearing 60. This bearing 60 supports the end of the helical conveying screw 18a, eliminating the need to cantilever the shaft from only one end and reducing the force on the reducer thrust bearing 42. A rotatable coupling 62 connects to the end of the shaft 58 to allow fluid communication of steam or a hot liquid with the interior of the shaft at 58 and the helical conveying screw 18a so that the feed may be heated to reduce the incidence of bacteria. Previous extruders provided heating from the driven end of the helical conveying screw, increasing the complexity of the apparatus at that end of the extruder. Piping 64 delivers the steam or hot fluid to the rotatable coupling 62, and/or removes relatively cooler liquid from the coupling.

The bearing 60 is connected to a support means 66 that is itself mounted to the main frame of the extruder 68. The reducer thrust bearing 42, the coupling 36, the inlet port 12, the cylindrical housing 10, the driving means 52 for sliding the sleeve 28, and the key way sliding means 50 are all also mounted to the main frame of the extruder 68. The main frame of the extruder 68 can then be mounted to the floor.

Figure 3:
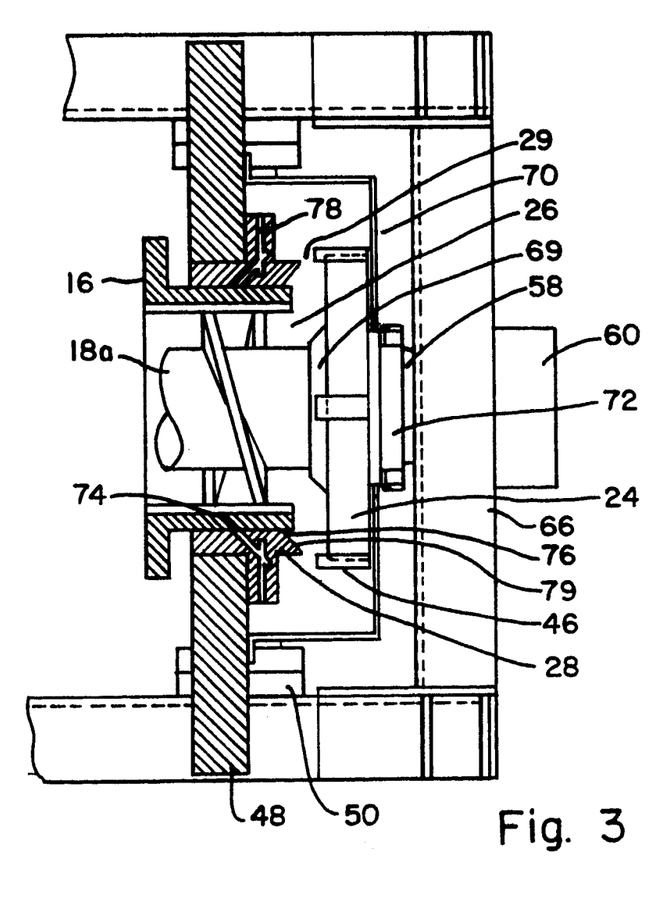
FIG. 3 is a detailed view of the discharge end of the extruder of FIG. 2, showing breaker bars mounted on the plate.
Figure 6:
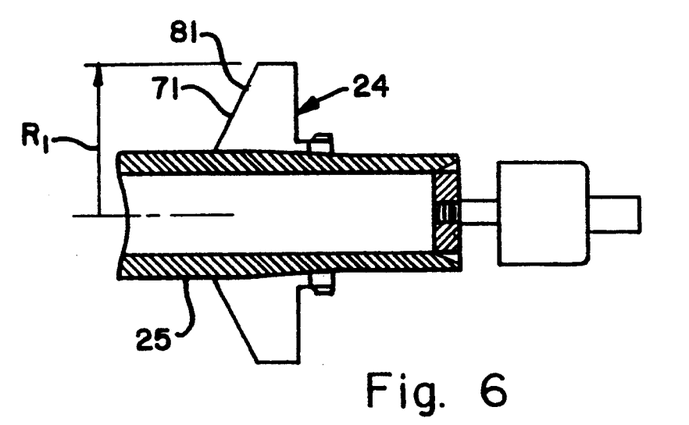
FIG. 6 is an enlarged view of the discharge end of the screw of FIG. 5, showing an alternative embodiment of the resistance plate.
Figure 7:
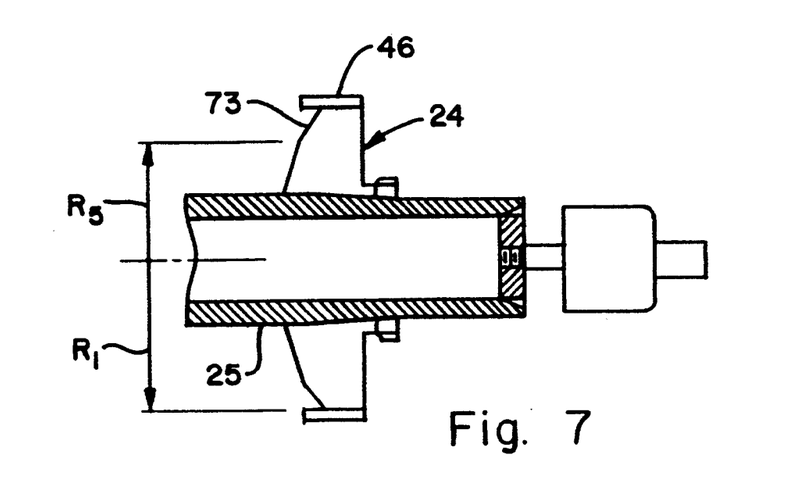
FIG. 7 is a view similar to FIG. 6, showing yet another embodiment of the resistance plate.

FIG. 3 is a detail of the discharge end 16 of the extruder shown in FIG. 2. The helical conveying screw 18a extends to the discharge end 16 of the cylinder 10. A tapered shoulder 69 is part of the plate 24 and supports the plate 24 where the plate attaches to the helical conveying screw 18a. The tapered shoulder 69 also helps direct the feed toward gap 26 and gap 29. The shoulder 69 could alternatively define a frustroconical plate with surface 71 that extends from the outer diameter of the shaft portion 25, to the radius R1, as shown in FIG. 6, or surface 73 from an intermediate radius R5 to the radius R1, as shown in FIG. 7.

Breaker bars 46 are attached in spaced apart relation along the circumference of the plate 24. The breaker bars 46 are rigidly mounted to the plate 24 and extend over the gap 26 and gap 29. Depending on the positioning of the sliding sleeve 28, the breaker bars 46 can fully cover the gap 29 or only cover part of the gap. The breaker bars 46 function to break large lumps of feed that have passed through gap 29 into smaller particles of feed. In the preferred embodiment the breaker bars 46 are rectangular, but other shapes can also serve to eliminate large lumps of feed emitting from the extruder. Around the plate 24 extends a housing 70 that attaches to the sliding sleeve support 48. This housing directs the discharged conditioned feed and prevents the feed from spilling onto the rest of the extruder. Mounted after the plate is a second flange 72 that also attaches the plate 24 to the helical conveying screw 18a and also interacts with the housing 70 to exclude the conditioned feed from the other regions of the extruder. The shaft 58 then continues through the bearing 60. The bearing is supported by the structure 66 (FIG. 2).

In the discharge end 16 of the cylindrical housing 10 are O-rings 74 and 76. The O-rings 74 and 76 create a seal between the discharge end 16 and the cylindrical sliding sleeve 28, keeping feed from interfering with the sliding of the cylindrical sliding sleeve 28. Lubrication ports 78 allow the introduction of lubrication to the area between the O-rings 74 and 76. A support mechanism 48 attaches to the cylindrical sliding sleeve. Also attached to the support mechanism 48 are key ways 50 that guide the support mechanism 48 as it slides along the length of the cylindrical housing 11. The surface 79 of sliding sleeve 28 oriented toward plate 24 is angled. The surface 79 further compresses feed passing through the extruder and guides the feed through the gap 29. The outwardly enlarging taper angle of extrusion surface 79 on sleeve 28, can also define the angle of the opposed conical surface 81 or 73 in the plate embodiments shown in FIGS. 6 and 7, respectively.

Figure 4:
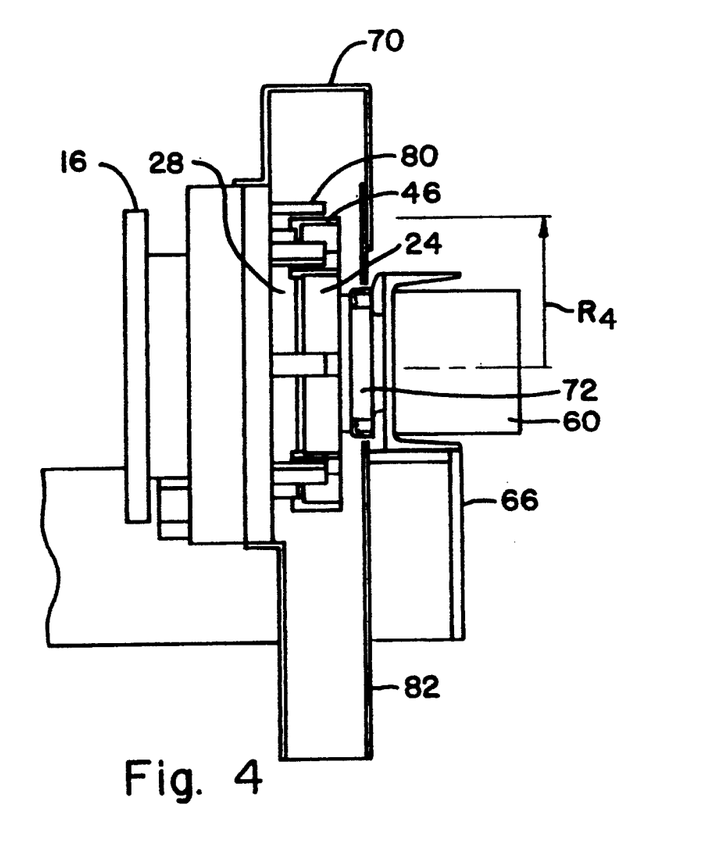
FIG. 4 is a detailed view of an alternative embodiment of the discharge end of the extruder with breaker bars mounted on the sliding sleeve and the plate.

FIG. 4 is a detail of the outside of the discharge end 16 of an alternative embodiment of the extruder. Plate 24 has breaker bars 46 of the type shown in FIG. 3. Also shown are breaker bars 80, rigidly mounted to the sliding cylindrical sleeve 28. The breaker bars 80 are rectangular in shape, although other shapes can also serve to break feed into smaller particles. The breaker bars 80 extend over gap 26 and gap 29. In one embodiment the breaker bars 80 are positioned outside the radius R4 defined by the outside circumference of plate 24 with breaker bars 46, and do not interfere with the rotation of plate 24 with breaker bars 46. Breaker bars 80 on the sliding cylindrical sleeve 28 interact with the breaker bars 46 on the plate 24 to fully break up clumps of conditioned feed that exit from the gap between the plate 24 and the discharge end 16 of the extruder. Bearing 60 is mounted to the support structure 66. The housing 70 directs the conditioned feed exiting the discharge end 16 down through the exit port 82 where it will continue on for further processing. Flange 72 supports the plate 24 and interacts with the housing 70 to exclude conditioned feed from the rest of the extruder.

Figure 5:
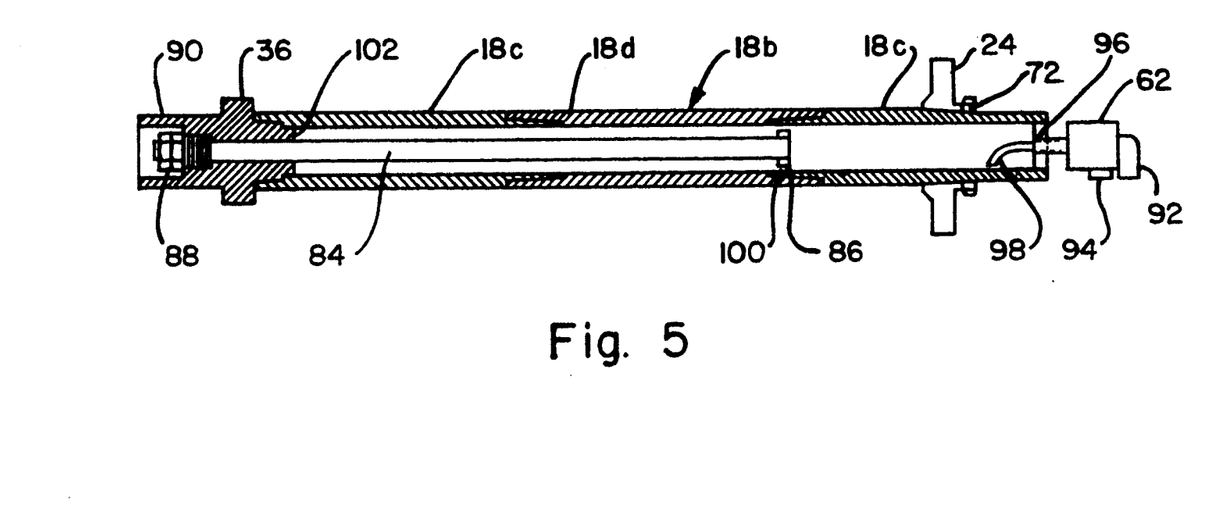
FIG. 5 is a detailed view of the fluid joint to add steam or hot fluid to the helical conveying screw.

FIG. 5 is a detail of the preferred shaft of the helical conveying screw without the flight detail. The shaft 18b consists of three sections 18c, 18d and 18e held together by tension bar 84. Tension bar 84 extends longitudinally within the shaft and attaches to a tension bar plate 86 which press fits against the inside wall of shaft section 18e. The other end of the tension rod 84 passes through shaft 36 and is secured by jam nut 88 and washers or Bellville springs 90. Mounted to shaft section 18e are plate 24 and flange 72. A rotatable coupling 62 is mounted to the end of shaft 18b. Steam is injected into port 92 and extracted from port 94. The steam enters the shaft 18b at the axis through tube 96 and the condensed liquid is extracted from the shaft 18b by pick-up tube 98 which is in part concentric within tube 96. Tension bar plate 86 contains passages 100 to allow steam or hot fluid to reach other portions of the shaft 18b, and where the tension bar 84 passes through shaft 36, seal 102 keeps steam or hot fluids from passing through to other portions of the extruder. In the embodiment of heating with steam, the steam enters the shaft through port 92 and tube 96. The steam fills the space in the shaft. Where the steam is in contact with the surfaces, it condenses to a liquid and collects on the lower section of the shaft 18b. The liquid is then withdrawn from the shaft by pick up 98 and exits by port 94.

Those skilled in this field can readily adapt the screw shown in FIG. 5, to accommodate liquid heating, by which relatively hot liquid is introduced axially via coupling at the discharge end and withdrawn at the driven end.

The advantage is that the heating steam can be more easily added and extracted at the end of shaft 18 opposite the end to which the motor or drive mechanism 22 attaches. Even in a fully liquid-heated arrangement, the ability to flow the hot liquid into the end of the screw shaft and out the other, considerably simplifies the component arrangement and interaction at the driven end of the screw.

I claim:
1. An annular gap extruder comprising:
  a cylindrical housing with an inlet port at a first end and a discharge section with a discharge opening at a second end;
  a conveying screw coaxially located within the cylindrical housing and including an inlet end at the housing inlet port and a discharge end at the housing discharge opening;
  means for rotating the conveying screw;
  a plate coaxially transversely mounted to the discharge end of the conveying screw near the discharge opening of the housing, thereby defining an annular gap (26) between the plate and the discharge opening, said plate having an outside radius;
  a cylindrical sleeve around the discharge section of the cylindrical housing, thereby defining a discharge gap (29) in confronting relation with the plate, said sleeve having an inside radius wherein said sleeve radius is less than said plate radius; and means for sliding the cylindrical sleeve laterally along the cylindrical housing, so that said discharge gap can be adjusted.

2. The annular gap extruder of claim 1, including means for introducing heated fluid into the discharge end of the conveying screw along the screw axis.

3. The annular gap extruder of claim 1, wherein a plurality of breaker bars are mounted in spaced apart relation on the plate, said breaker bars extending over the gap between the plate and the discharge opening.

4. The annular gap extruder of claim 1, wherein a plurality of breaker bars are supported by the discharge section, said breaker bars extending over the gap between the plate and the discharge opening.

5. The annular gap extruder of claim 1, wherein the conveying screw has an interrupted helix flight and the cylindrical housing has radial pins or bars extending toward the screw at the interruptions.

6. The annular gap extruder of claim 1, wherein the conveying screw is supported at both ends by respective bearing means.

7. The annular gap extruder of claim 6, wherein
an axial passage is provided in the helical conveying screw at the discharge end where supported by the bearing means; and
a means for flowing hot fluid through the passage is provided adjacent the bearing means.

8. The annular gap extruder of claim 1 wherein said means for sliding the sleeve comprises a pair of jack means laterally disposed on opposite sides of the sleeve, each of said jack means comprising a screw jack connected to an adjustable gear motor.

9. The annular gap extruder of claim 1, wherein a plurality of breaker bars are mounted to the plate and extend over the gap between the plate and the discharge opening.

10. The annular gap extruder of claim 9, wherein a plurality of breaker bars are mounted to the cylindrical sleeve and extend over the gap between the plate and the discharge opening.

11. An annular gap extruder unit comprising:
a cylindrical housing with an inlet port for receiving feed material at a first end, a compression section for compressing the material and a discharge section with a discharge opening for extruding the compressed material at a second end;
a conveying screw coaxially located within the cylindrical housing and including an inlet end at the housing inlet port and a discharge end at the housing discharge opening;
first means, for rotating the conveying screw whereby feed material is conveyed, compressed, and extruded as a result of the rotation of the screw;
second means, coaxially transversely mounted to the discharge end of the conveying screw for co-rotation therewith near the discharge opening of the housing, thereby defining a radially oriented gap between the second means and the discharge opening;
sleeve means around the discharge section of the cylindrical housing thereby defining a discharge gap in confronting relation with the second means; and
means for moving the sleeve means laterally along the cylindrical housing, so that said discharge gap can be adjusted.

12. The annular gap extruder of claim 11 wherein said means for moving the sleeve comprises a pair of jack means laterally disposed on opposite sides of the sleeve, each of said jack means comprising a screw jack connected to an adjustable gear motor.

13. The annular gap extruder of claim 11, wherein a first plurality of breaker bars are mounted in spaced apart relation on the second means, said breaker bars extending over the discharge gap.

14. The annular gap extruder of claim 13, wherein a second plurality of breaker bars are supported by the discharge section, said breaker bars extending over the discharge gap toward the first plurality of breaker bars.

15. A method of conditioning and extruding material by rotating a screw within a substantially cylindrical housing, comprising the steps of:
conveying the material with said screw from an inlet port to a discharge opening in the housing whereby the material is conditioned;
rotating a resistance plate with the rotating screw at the discharge opening, where a discharge gap is formed in confronting relationship between said plate and the housing such that material extrudes out of the housing substantially radially through said discharge gap; and
adjusting the size of said discharge gap with a cylindrical sleeve to adjust the amount of conditioning of the material.

16. The method of claim 15, including the step of supporting the screw with a bearing member situated on an axial extension of the screw shaft from the resistance plate.

17. The method of claim 16, including the step of passing hot fluid through the shaft axis adjacent said bearing member.

* * * * *